Jan. 6, 1953  E. W. YETTER  2,624,770
VACUUM TUBE VOLTMETER
Filed Feb. 11, 1949

INVENTOR.
EDWARD W. YETTER
BY
ATTORNEYS

Patented Jan. 6, 1953

2,624,770

UNITED STATES PATENT OFFICE 2,624,770

VACUUM TUBE VOLTMETER

Edward W. Yetter, Philadelphia, Pa., assignor to Sun Oil Company, Philadelphia, Pa., a corporation of New Jersey Application February 11, 1949, Serial No. 75,851

13 Claims. (Cl. 171—95)

This invention relates to a vacuum tube voltmeter particularly designed for the measurement of a particular repeated ordinate of a periodic potential.

The measurement of periodically varying potentials is generally accomplished through the production of a corresponding wave pattern on an oscilloscope, measurement of ordinates being made through the provision of a scale superimposed on the oscilloscope screen or by the changing of oscilloscope bias through the introduction of a measurable direct potential to cause the shift of the exhibited wave such as will bring a particular ordinate to zero. Measurements made in this fashion are inherently inaccurate due to the fact that the oscilloscope spot displacement is non-linear with potential, the oscilloscope spot has appreciable diameter, input capacities are fairly large, etc. In accordance with the present invention a periodic potential to be measured is sampled at any particular repeating abscissa through the generation and utilization of a narrow pulse in such fashion that the pulse gates the potential to be measured and through an integrating system a series of resulting pulses result in the production of a substantially fixed potential which can be read directly on a meter. The arrangement is such that accurate calibration may be effected through the application of direct potentials to the input in place of the potentials to be measured. In particular, the metering arrangement provided in accordance with the invention gives results which are independent of repetition frequency and which will follow rapid changes in the input potential.

Figure 1:
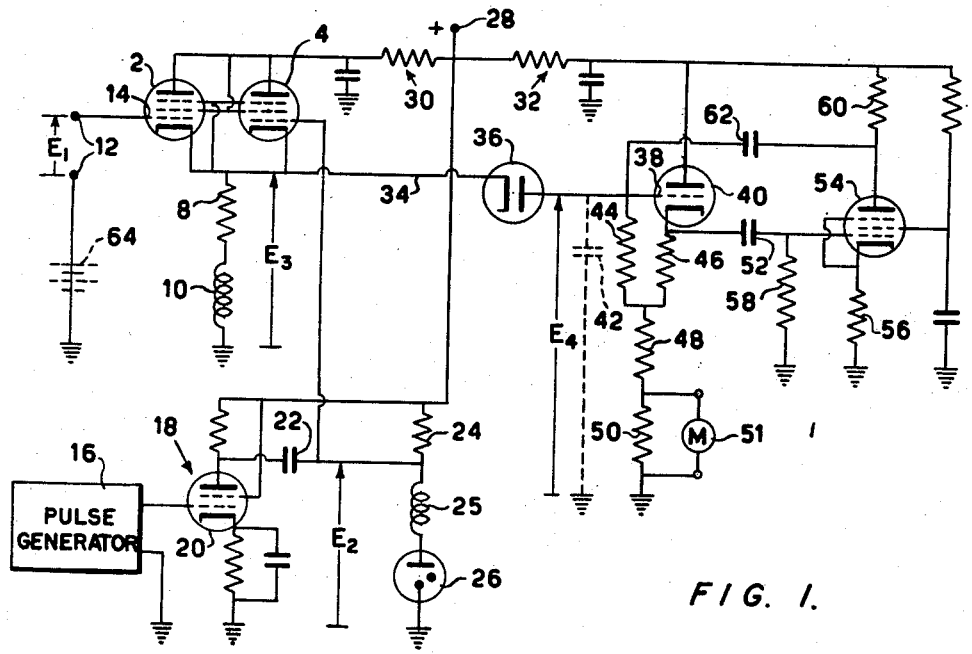
Figures 2, 3:
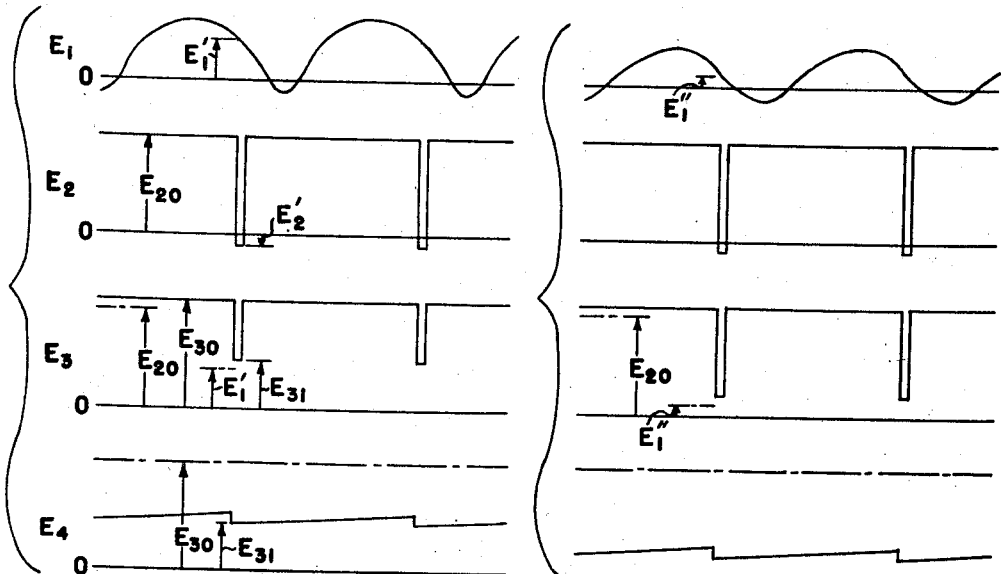

The foregoing indicates the general objects of the present invention. These objects, together with others which are particularly directed to circuit elements and their novel associations, may be best made clear by reference to the following description read in conjunction with the accompanying drawing in which:

Figure 1 is a wiring diagram illustrating a preferred embodiment of the apparatus; and Figures 2 and 3 are potential diagrams serving to illustrate the principles and operation of the apparatus.

The construction of the apparatus will first be described with reference to Figure 1. A pair of pentodes 2 and 4 are connected in parallel, except for their control grids, in a cathode follower circuit including the cathode resistor 8 and, preferably a high frequency choke indicated at 10. While pentodes having high transconductance and sharp cut-off characteristics are preferable, it will become clear that these may be replaced if desired by triodes, tetrodes or other vacuum tubes and that the paired tube elements may be contained in a single evacuated envelope. It will be understood that where "tubes" are referred to there is understood the possibility that they may have a common envelope. The input to the grid 14 of the tube 2 is provided between the terminals 12. This input consists of the periodic potential, a particular ordinate of which is to be measured.

At 16 there is indicated a pulse generator which may be of any of the types well known in the art capable of producing periodically narrow pulses of approximately rectangular shape though, as will be evident hereafter, if the pulses are narrow their shapes are relatively immaterial. As an example, if the periodic wave to be sampled and measured has a frequency in the audio range the pulse length may well be of the order of one microsecond upwardly. The pulse, in the form of a positive pulse, is applied to the control grid of an amplifier tube 20 in a conventional resistance-coupled amplifier circuit, a corresponding amplified negative pulse being delivered through the condenser 22. The condenser 22 is connected to the junction of a resistor 24 and a choke 25 which in turn connects with the anode of a voltage regulating tube 26 of the gas-filled type, which tube, so long as current is flowing, will have its anode maintained at a substantially constant potential above ground. The choke 25 provides a substantial A. C. impedance to ground, the voltage regulating tube having a very small A. C. impedance. The anode supplies to the tubes 20 and 26 are from a positive potential terminal 28 of a power supply, from which terminal an anode potential may be supplied also to the anodes and screens of the tubes 2 and 4 through a filter 30 and also to the anode and screen of a pair of tubes hereafter described through a second filter 32. These filters 30 and 32 are to eliminate from the tubes supplied therethrough surges which may appear at the terminal 28 because of the pulses of current flowing in the tube 20.

The connected cathodes of the tubes 2 and 4 are joined through connection 34 to the cathode of a diode 36 which is illustrated as of the thermionic vacuum type though this may be replaced by a germanium crystal or other rectifier of known types. The anode of the rectifier 36 is connected to the grid 38 of a triode 40. For purposes of explanation it may be considered that there is a condenser 42 between this grid and ground, but in actual construction and operation the capacity at this point may be provided solely by the grid-cathode capacity in the tube 40 and other incidental capacities of the wiring, tube socket, etc. The tube 40 is in a cathode follower circuit including the resistances 46, 48 and 50 between cathode and ground. Between the grid 38 and these cathode resistors there is a very high resistance 44 which may, for example, have a value upwards of twenty megohms.

The measuring meter conventionalized at 51 is connected across the resistor 50. This may be merely a direct current voltmeter or it may be a recording potentiometer, or the like. At any rate, the output is measured by the current flowing between the cathode of tube 40 and ground or by a potential measured across some part or all of the resistance between cathode and ground.

The cathode of tube 40 is connected through the condenser 52 to the control grid of a pentode 54, the cathode of which is connected to ground through a resistance 56 while the control grid is connected to ground through the resistance 58. The anode of the tube 54 is provided with the load resistor 60 and is connected through the condenser 62 with the grid of the tube 40. As will become hereafter clear, the tube 54 and its connections provide a dynamic capacitance arranged to be large under static conditions to suppress ripple but small under changing conditions to give a rapid response in the circuit.

The operation of the circuit may now be described.

First there may be referred to the characteristics of the cathode follower arrangement of the tubes 2 and 4 for which purpose it may be assumed that the connection 34 is opened. (For simplicity of explanation it will be understood that unless otherwise indicated potentials referred to will be considered to be potentials above ground.) Assume first that there is no pulse provided from the pulse generator 16. In such case current flow from the supply terminal 28 occurs through the resistor 24 and the voltage regulating tube 26 with the result that at the anode of the tube 26 there exists the potential which this tube is normally designed to maintain as, for example, a potential of the order of one hundred volts. Assuming now that the tube 2 is cut off, the potential of the cathode of the tube 4 will be slightly in excess of the potential of the control grid of the tube 4 maintained at the anode potential of the tube 26. This is, of course, the condition which would exist if the tube 4 was in a single tube cathode follower circuit without the presence of the tube 2. It will now be evident that the tube 2 will actually be cut off and hence effectively missing from the circuit if the potential of its control grid 14 is substantially less than the potential of the control grid of the tube 4 because when this is the case the control grid 14 will have a potential less than the cathode of the tube 2 greater than the cut-off potential of this tube. It is for this reason that the tube 2 is desirably of a sharp cut-off type, this applying also to tube 4. In the operation of the circuit the input potential between terminals 12 has an amplitude which is always substantially less than the potential of the control grid of tube 2 so that in the absence of a pulse, as assumed, the tube 2 is always cut off. To summarize, under the conditions stated the cathodes of the tubes 2 and 4 are at a constant high potential.

Assume now that the grid 14 of tube 2 is at a positive potential and that a negative pulse applied through the condenser 22 to the control grid of the tube 4 has such a magnitude that the tube 4 would be cut off even if the cathode of the tube 4 was at zero potential. Under this condition the control grid of the tube 4 would be driven negatively beyond cut-off. The tube 4 being then cut off and essentially out of the circuit, the cathodes of the tubes 2 and 4 would assume a potential slightly higher than the potential of the control grid 14, the effect now being that of having the tube 2 in a single tube cathode follower circuit with tube 4 absent.

To summarize the foregoing it will now appear that in the absence of a negative pulse applied to the control grid of tube 4 a constant high potential is assumed by the cathodes of the tubes 2 and 4 and the tube 2 is, in effect, out of the circuit so long as its grid potential is insufficiently high to produce conduction through this tube. On the other hand, in the presence of a sufficiently large negative pulse, as described, at the control grid of the tube 4 this latter tube is effectively out of the circuit and the cathodes assume a potential which is related to the potential of the grid 14 during the persistence of the pulse. It may be here noted that potentials could occur through a certain range at the grids of both of the tubes to produce simultaneous current flow through both; but this condition is not achieved to the extent of having any effect on the circuit operation if the applied pulses are essentially rectangular in shape. The actual operation may be assumed to involve current flow in one or the other of the tubes as described without simultaneous current flow.

The choke 10 compensates for the cathode-ground capacitance shunting the cathode resistor.

Reference may now be made to Figures 2 and 3. There is indicated at $E_1$ a cyclic potential impressed at the terminals 12. At $E_2$ there is illustrated the potential appearing at the control grid of tube 4, this potential being the constant potential $E_{20}$ except upon the occurrence of a pulse which drops the potential of this grid below zero as indicated at $E'_2$. The pulse which is provided is adjusted to occur at the particular phase of the cyclic input potential at which the ordinate of this input potential is to be measured, the ordinate at the time of occurrence of the pulse being indicated at $E'_1$.

The phase relation of the pulse to the potential undergoing measurement may be adjusted in various fashions, for example, by causing the potential to be measured to produce synchronization of the pulse generator by feeding a component thereof to the generator, the pulse generator being provided with a conventional phase shifter so that the pulse may be located in any desired phase position with respect to the potential being measured. To do this, of course, it is desirable that there should be used in connection with the apparatus an oscilloscope to which there is fed both the potential undergoing measurement and the pulse so that phase adjustment may be visually made. It should be noted, however, that this phase adjustment does not involve the use of the oscilloscope to effect any measurement of the ordinate of the potential measurement.

It may be here noted that driving the grid of the tube 4 beyond cut-off would produce extinguishing of the voltage regulator tube 26 if it were not for the choke 25 which prevents such occurrence. The tube 26 should never be cut off.

The third curve in Figure 2 illustrates the varying potential conditions of the cathodes of the tubes 2 and 4. In the absence of the sampling pulse the cathodes would be at a constant potential $E_{30}$, this potential being slightly greater than the potential $E_{20}$. At the time of occurrence of a pulse, however, the cathodes assume a potential $E_{31}$ only slightly greater than the potential $E'_1$. For comparison with Figure 2, Figure 3 is provided to show the corresponding results if the sampling of another wave occurred at an ordinate $E''_1$. In this case it will be noted that the potential of the cathodes attained at the time of the pulse is lower than before and slightly greater than $E''_1$. It may be here noted that since these cathode potentials are attained when the action is essentially that of a single tube cathode follower, the resulting cathode potentials are linearly related to the input potentials to the same degree as is characteristic of an ordinary cathode follower circuit, this linearity of response being quite good.

It may be noted that the function of tube 4 is that of maintaining the cathode of tube 2 normally at a high potential effecting cut-off of tube 2. Such normal potential of the cathode may obviously be attained by providing through resistor 8 current in other fashions which current may be interrupted by pulses from a pulse generator as, for example, by replacing tube 4 by a gas filled tube the anode potential of which may be periodically dropped sufficiently to produce deionization. The same result may be accomplished in various other fashions though that described is preferred.

There may now be considered the effects of the operations indicated upon the circuit including the rectifier 36 and tube 40. It may be assumed, for purposes of preliminary explanation, that the tube 54 is absent.

The circuit of the tube 40 is so adjusted that the free potential of its grid 38 would be higher than the highest potential assumed by the cathodes of tubes 2 and 4. Due to the rectifier 36, however, and the high resistance 44 the grid 38 cannot attain a potential greater than the potential of these cathodes in the absence of a pulse. Assume that a condenser 42 is present which, as stated, may be actually constituted by the incidental capacitances at the tube 40. When a negative pulse occurs as described above the potential of the rectifier cathode drops and accordingly the condenser 42 will discharge through the rectifier and the effective output resistance of the tube 2 thus lowering the potential of the grid 38 toward the potential of the cathodes 2 and 4 at the peak of the pulse. This discharge takes place rapidly since the capacity at 42 is small, the forward resistance of the rectifier is quite small, and the effective output resistance of the cathode follower circuit involving tube 2 is also small due to the cathode follower action. In fact, the potential of grid 38 will now drop substantially to the potential of the cathodes.

After the passage of the pulse the rectifier cathode returns to its normal potential and consequently the capacity at 42 begins to charge through resistor 44 and the connections thereto. This resistor, as previously stated, has a quite high resistance value and its effective value is still higher because of the action of the cathode follower arrangement of tube 40 which may multiply its input resistance by a large factor. The result is that the capacitance at 42 becomes discharged essentially to the potential of the cathodes corresponding to the pulse peaks and remains essentially at this potential with a minor ripple due to the charging action between the pulses. The potential $E_4$ is indicated in Figure 2 with the ripple greatly exaggerated for any condition of more than very low frequencies. It will be evident therefore, that the response of a meter connected in or to the cathode circuit of the tube 40 will essentially measure the ordinate $E'_1$ of the applied periodic potential. Through the use of the cathode followers, furthermore, the current in the cathode circuit of tube 40 will be very nearly linearly proportional to the value of this sampled ordinate.

The characteristics involved in the discharge and charging of the capacitance at 42 while leading to ripple suppression are detrimental in attaining rapid following of increases in the sampled input potential. A quick decrease of input potential at $E'_1$ is very quickly followed by the grid 38 because the readjustment of potentials taking place in the circuit involve the rapid discharge of the capacitance 42. However, if an increase of $E'_1$ occurs there will be a lag in readjustment of the circuit due to the large time constant involved in the charging of capacitance 42. If the time constants are made small so as to give rapid response the ripple may become excessive.

To remedy this condition there is provided a dynamic capacitance arranged to be large under static conditions so that the ripple will be small but small under changing conditions to give rapid response. This end is accomplished by the use of the amplifier tube 54 and the condenser 62. The arrangement is such that the amplified ripple fed to the control grid of the tube 54 through the condenser 52 is fed back in opposite phase through the condenser 62 thus very considerably reducing the amplitude of the ripple. The capacity which is effective in the filtering action is now approximately the capacitance at 42 plus the product of the capacitance of condenser 62 multiplied by the gain of the amplifier including the tube 54. Because of this the capacitance 42 may be reduced to no more than the stray capacitance of the leads and between the electrodes. The selection between the ripple which is to be suppressed and the change involving the build-up of potential on capacitance 42 which contains primarily low frequency components is achieved by choice of a suitable time constant of the amplifier input consisting of the resistance 58 and condenser 52. Other types of high pass filters could be here used. The choice is such that the ripple is considerably amplified but the slow build-up of potential is not. The gain of the amplifier which is the major term in the effective filter capacitance is thus made large under static conditions but small under ordinary conditions of relatively slow increase in input potential taking place through a reasonably small number of cycles.

As will be evident, the circuit will measure only positive ordinates of an applied wave; however, there may be introduced, as indicated at 64, a positive biasing potential so that, if desired, negative ordinates of an alternating signal may be measured by shifting them to a positive condition of the grid 14.

As an indication of the characteristics of this type of circuit there may be referred to the performance of a circuit constructed in accordance with the foregoing. With an input range of measurable potential of zero to one hundred volts and a pulse length of one microsecond, tests showed linearity within 2% over the full range with a frequency error of less than 2% from fifty cycles per second to one thousand cycles per second. At an input frequency of two hundred and fifty cycles per second, the time necessary for a full scale change in the direction of increase of signal potential was approximately ten cycles. At this frequency the ripple was less than 1% and the output was essentially independent of the pulse width for a range of width from 0.75 microsecond to twenty microseconds.

The broader aspects of the invention herein are claimed in the application of Omar L. Patterson, Serial No. 316,174, filed October 22, 1952.

What I claim and desire to protect by Letters Patent is:

1. In combination, a pair of thermionic vacuum tube electrode assemblies, each having cathode, anode and grid elements, means providing a common cathode impedance for said assemblies between their cathodes and a terminal, connections through which a periodic potential may be applied between the grid of one of said assemblies and said terminal, means for applying between the grid of the other of said assemblies and said terminal a potential sufficient to effect cut-off of the first assembly, means for applying periodically, and in synchronism with said periodic potential, between the grid of the second assembly and said terminal a narrow pulse sufficient to effect cut-off of the second assembly, and means for measuring the peak cathode potentials of said assemblies resulting at the times of application of said pulses.

2. In combination, a pair of thermionic vacuum tube electrode assemblies, each having cathode, anode and grid elements, means providing a common cathode impedance for said assemblies between their cathodes and a terminal, connections through which a periodic potential may be applied between the grid of one of said assemblies and said terminal, means for applying between the grid of the other of said assemblies and said terminal a potential sufficient to effect cut-off of the first assembly, means for applying periodically between the grid of the second assembly and said terminal a pulse sufficient to effect cut-off of the second assembly, and means for measuring the peak cathode potentials of said assemblies resulting at the times of application of said pulses, said measuring means including a rectifier element connected to pass current substantially only when said cathode potential decreases.

3. In combination, a pair of thermionic vacuum tube electrode assemblies, each having cathode, anode and grid elements, means providing a common cathode impedance for said assemblies between their cathodes and a terminal, connections through which a periodic potential may be applied between the grid of one of said assemblies and said terminal, means for applying between the grid of the other of said assemblies and said terminal a potential sufficient to effect cut-off of the first assembly, means for applying periodically between the grid of the second assembly and said terminal a pulse sufficient to effect cut-off of the second assembly, and means for measuring the peak cathode potentials of said assemblies resulting at the times of application of said pulses, said measuring means including a rectifier element having its cathode connected to the cathodes of said elements, and a high resistance connected between the anode of said rectifier and a source of positive potential.

4. In combination, a pair of thermionic vacuum tube electrode assemblies, each having cathode, anode and grid elements, means providing a common cathode impedance for said assemblies between their cathodes and a terminal, connections through which a periodic potential may be applied between the grid of one of said assemblies and said terminal, means for applying between the grid of the other of said assemblies and said terminal a potential sufficient to effect cut-off of the first assembly, means for applying periodically between the grid of the second assembly and said terminal a pulse sufficient to effect cut-off of the second assembly, and means for measuring the peak cathode potentials of said assemblies resulting at the times of application of said pulses, said measuring means including a rectifier element having its cathode connected to the cathodes of said elements, a high resistance connected between the anode of said rectifier and a source of positive potential, and a cathode follower circuit controlled by the potential of the anode of said rectifier.

5. In combination, a pair of thermionic vacuum tube electrode assemblies, each having cathode, anode and grid elements, means providing a common cathode impedance for said assemblies between their cathodes and a terminal, connections through which a periodic potential may be applied between the grid of one of said assemblies and said terminal, means for applying between the grid of the other of said assemblies and said terminal a potential sufficient to effect cut-off of the first assembly, means for applying periodically between the grid of the second assembly and said terminal a pulse sufficient to effect cut-off of the second assembly, and means for measuring the peak cathode potentials of said assemblies resulting at the times of application of said pulses, said measuring means including a rectifier element having its cathode connected to the cathodes of said elements, a high resistance connected between the anode of said rectifier and a source of positive potential, and means presenting to the anode of said rectifier an effectively high capacitance at the frequency of said periodic potential but an effectively low capacitance for relatively lower frequencies.

6. In combination, a pair of thermionic vacuum tube electrode assemblies, each having cathode, anode and grid elements, means providing a common cathode impedance for said assemblies between their cathodes and a terminal, connections through which a periodic potential may be applied between the grid of one of said assemblies and said terminal, means for applying between the grid of the other of said assemblies and said terminal a potential sufficient to effect cut-off of the first assembly, means for applying periodically between the grid of the second assembly and said terminal a pulse sufficient to effect cut-off of the second assembly, and means for measuring the peak cathode potentials of said assemblies resulting at the times of application of said pulses, said measuring means including a rectifier element having its cathode connected to the cathodes of said elements, a high resistance connected between the anode of said rectifier and a source of positive potential, a cathode follower circuit controlled by the potential of the anode of said rectifier, and means presenting to the anode of said rectifier an effectively high capacitance at the frequency of said periodic potential but an effectively low capacitance for relatively lower frequencies.

7. In combination, a thermionic vacuum tube electrode assembly including cathode, anode and grid elements, means providing an impedance between said cathode and a terminal, connections through which a periodic potential may be applied between the grid of said assembly and said terminal, means normally providing a current flow through said impedance sufficient to effect cut-off of said assembly, means providing pulses which are of short duration relative to the period of said periodic potential for periodically, and in synchronism with said periodic potential, interrupting said current flow provided by the last mentioned means to render said assembly conductive under control of said periodic potential, and means for measuring the peak cathode potential of said assembly resulting at the times of said pulses.

8. In combination, a thermionic vacuum tube electrode assembly including cathode, anode and grid elements, means providing an impedance between said cathode and a terminal, connections through which a periodic potential may be applied between the grid of said assembly and said terminal, means normally providing a current flow through said impedance sufficient to effect cut-off of said assembly, means for periodically interrupting said current flow provided by the last mentioned means to render said assembly conductive under control of said periodic potential, and means for measuring the peak cathode potential of said assembly resulting at the times of said interruptions, said measuring means including a rectifier element connected to pass current substantially only when said cathode potential decreases.

9. In combination, a thermionic vacuum tube electrode assembly including cathode, anode and grid elements, means providing an impedance between said cathode and a terminal, connections through which a periodic potential may be applied between the grid of said assembly and said terminal, means normally providing a current flow through said impedance sufficient to effect cut-off of said assembly, means for periodically interrupting said current flow provided by the last mentioned means to render said assembly conductive under control of said periodic potential, and means for measuring the peak cathode potential of said assembly resulting at the times of said interruptions, said measuring means including a rectifier element having its cathode connected to the cathodes of said elements, and a high resistance connected between the anode of said rectifier and a source of positive potential.

10. In combination, a thermionic vacuum tube electrode assembly including cathode, anode and grid elements, means providing an impedance between said cathode and a terminal, connections through which a periodic potential may be applied between the grid of said assembly and said terminal, means normally providing a current flow through said impedance sufficient to effect cut-off of said assembly, means for periodically interrupting said current flow provided by the last mentioned means to render said assembly conductive under control of said periodic potential, and means for measuring the peak cathode potential of said assembly resulting at the times of said interruptions, said measuring means including a rectifier element having its cathode connected to the cathodes of said elements, a high resistance connected between the anode of said rectifier and a source of positive potential, and a cathode follower circuit controlled by the potential of the anode of said rectifier.

11. In combination, a thermionic vacuum tube electrode assembly including cathode, anode and grid elements, means providing an impedance between said cathode and a terminal, connections through which a periodic potential may be applied between the grid of said assembly and said terminal, means normally providing a current flow through said impedance sufficient to effect cut-off of said assembly, means for periodically interrupting said current flow provided by the last mentioned means to render said assembly conductive under control of said periodic potential, and means for measuring the peak cathode potential of said assembly resulting at the times of said interruptions, said measuring means including a rectifier element having its cathode connected to the cathodes of said elements, a high resistance connected between the anode of said rectifier and a source of positive potential, and means presenting to the anode of said rectifier an effectively high capacitance at the frequency of said periodic potential but an effectively low capacitance for relatively lower frequencies.

12. In combination, a thermionic vacuum tube electrode assembly including cathode, anode and grid elements, means providing an impedance between said cathode and a terminal, connections through which a periodic potential may be applied between the grid of said assembly and said terminal, means normally providing a current flow through said impedance sufficient to effect cut-off of said assembly, means for periodically interrupting said current flow provided by the last mentioned means to render said assembly conductive under control of said periodic potential, and means for measuring the peak cathode potential of said assembly resulting at the times of said interruptions, said measuring means including a rectifier element having its cathode connected to the cathodes of said elements, a high resistance connected between the anode of said rectifier and a source of positive potential, a cathode follower circuit controlled by the potential of the anode of said rectifier, and means presenting to the anode of said rectifier an effectively high capacitance at the frequency of said periodic potential but an effectively low capacitance for relatively lower frequencies.

13. In combination, a pair of thermionic vacuum tube electrode assemblies, each having cathode, anode and grid elements, means providing a common cathode impedance for said assemblies between their cathodes and a terminal, connections through which a periodic potential may be applied between the grid of one of said assemblies and said terminal, means for applying between the grid of the other of said assemblies and said terminal a potential sufficient to effect cut-off of the first assembly, means for applying periodically, and in synchronism with said periodic potential, between the grid of the second assembly and said terminal a pulse which is of short duration relative to the period of said periodic potential and sufficient in amplitude to effect cut-off of the second assembly, and means for measuring the peak cathode potentials of said assemblies resulting at the times of application of said pulses.

EDWARD W. YETTER.

REFERENCES CITED

The following references are of record in the file of this patent:

UNITED STATES PATENTS

| Number | Name | Date |
|---|---|---|
| 2,089,430 | Roys et al. | Aug. 10, 1937 |
| 2,221,115 | Shepard | Nov. 12, 1940 |
| 2,266,509 | Percival | Dec. 16, 1941 |
| 2,338,395 | Bartelink | Jan. 4, 1944 |

OTHER REFERENCES

Publication I.—"A New Oscillograph Accessory for Direct Measurement of Signal Amplitude," The Oscillographer, vol. 9, No. 2, March-April 1947, pages 1, 2 and 3. (Copy in Division 69.)